Figure 1:
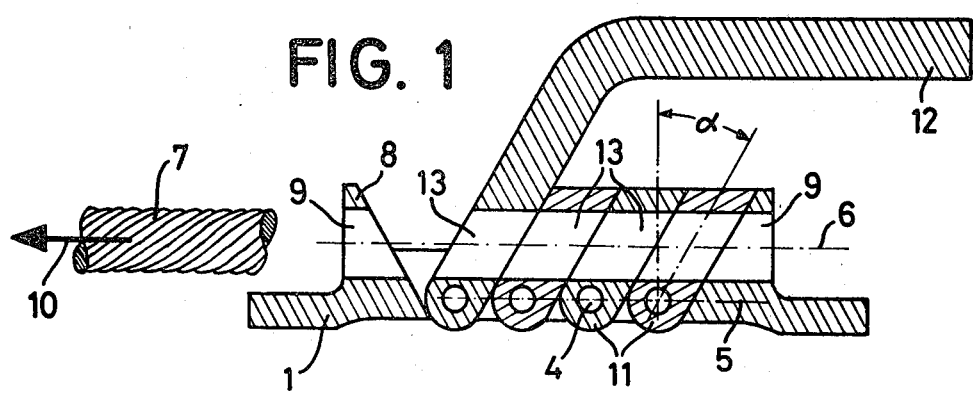

United States Patent [19]

Siegmann

[11] 4,413,382
[45] Nov. 8, 1983

[54] ROPE CLAMP

[76] Inventor: Goetz Siegmann, Kressbron, Fed. Rep. of Germany

[21] Appl. No.: 228,283

[22] Filed: Jan. 26, 1981

[30] Foreign Application Priority Data

Jan. 29, 1980 [CH] Switzerland ............................ 725/80

[51] Int. Cl.³ ............................................. F16G 11/10
[52] U.S. Cl. ................................................. 24/132 R
[58] Field of Search ................. 24/132 R, 133, 134 R, 24/134 KB, 134 N, 134 P, 120, 115 G, 115 M, 132 AA

[56] References Cited

U.S. PATENT DOCUMENTS

| | | | |
|---|---|---|---|
| 1,476,468 | 12/1923 | Sargent | 24/132 WL |
| 1,759,485 | 5/1930 | LePage | 24/132 R |
| 1,800,004 | 4/1931 | Armstrong | 24/132 R |
| 2,157,639 | 5/1939 | Staggers | 24/132 R |
| 2,264,936 | 12/1941 | Dorsa | 24/132 R |
| 2,431,819 | 12/1947 | Meyer | 24/132 R |
| 3,845,523 | 11/1974 | Mayberry | 24/134 P |
| 4,034,828 | 7/1977 | Rosa et al. | 24/134 KB |
| 4,080,918 | 3/1978 | Bonhard | 24/132 R |

FOREIGN PATENT DOCUMENTS 891058 3/1962 United Kingdom ............ 24/132 R

Primary Examiner—Paul J. Hirsch
Attorney, Agent, or Firm—Amster, Rothstein & Engelberg

[57] ABSTRACT

A rope clamp, in which the rope (7) is guided through rope openings (13) of several clamping members (11) which can be pivoted parallel to one another, secures the rope (7) automatically. To enable the holding force to be increased and the clamping effect to be accurately adjusted, the rope openings (13) have a considerable length and the clamping members (11) are inclined, in their open position which permits a free passage of the rope, against the rope pulling direction (10). Preferably, plane clamping plates of approximately the same thickness as the rope are used. The cylindrical rope openings are made obliquely in the clamping plates and, in the inclined open position of these, are aligned with one another along the same axis. A hand lever (12) can be moulded onto the front clamping plate. Furthermore, a spring can be provided, which presses on the rear clamping plate in the rope pulling direction and, at the same time, serves to detain the lever in the open position.

4 Claims, 5 Drawing Figures

ROPE CLAMP

The invention relates to a rope clamp, in which the rope is guided through rope openings of several pivotable clamping members and the pivot axes of the clamping members extend in a common axial plane at a distance from the rope and perpendicular thereto. A rope clamp of this type secures a rope made of hemp, synthetic fibre or wire reliably at a freely selected point against the rope traction (load) which is applied in the rope pulling direction, and this rope clamp is operated automatically in that the rope traction alone actuates the clamping device and in that the lock is released when the rope is pulled back.

A rope clamp of this type is known, in conjunction with a safety device, from German Auslegeschrift No. 1,169,819 . The clamping members are relatively thin plates through whose round rope openings the rope can be pulled without obstruction. The length (depth) of the rope openings is so small, in comparison with the material thickness of the clamping members, that the edge of the rope opening on the entry side cannot be distinguished from the inner surface of the rope opening and from the edge on the exit side. Rather, the rounded edges merge into one another. There is no inner surface with a form having a definable axis. In the open position, the clamping plates are perpendicular to the rope pulling direction and have a mutual spacing of at least five times their thickness. The clamping effect arises due to the fact that the clamping plates which are hinged to one another by means of a setting rod are inclined in the rope pulling direction and, as a result, bend the rope in a zigzag manner or deform it in an undulating manner. In the course of the inclining movement of the clamping plates, the edge zones of the rope openings, which lie diametrically opposite one another and which press on the rope, move ever farther apart from one another in the rope pulling direction.

However, in the case of a very high rope traction of the order of the breaking load of the rope, the known clamp no longer holds securely and the outer fibres of the rope are damaged by the extreme bending strain. It is possible to release the known clamp only when the rope is slackened or when an equally large counteracting traction is applied, this being highly disadvantageous in the case of use on sailing boats for paying-out sail-lines.

However, the known eccentric clamps, also, which are in very widespread use in sailing permit, without counteracting traction of the order of the load, only an uncontrolled, abrupt release and bring about a reduction in the loading capacity of the rope.

The obJect of the invention is to provide a rope clamp of the above-mentioned type which can be installed permanently, in which the clamping effect is approximately equal to the breaking load of the rope and which makes it possible, in the case of full rope traction, to pay out freely selectable rope lengths by means of a controlled reduction of the clamping effect, without a counteracting traction applied to the rope being necessary.

This object is achieved, according to the invention, due to the fact that the clamping members have rope openings of considerable length and, in their open position which permits a free passage of the rope, are inclined in relation to the axial plane, against the rope pulling direction. The length of the rope openings is deemed to be considerable when, in the course of the inclining movement of the clamping members, the front and rear edges of the same rope opening are mutually displaced to a recognisable extent in the projection in the rope pulling direction. This is the case, already, with a length of the rope openings (thickness of the clamping members) of approximately 4 mm, but is more marked at 10 or 12 mm.

Whereas, in the above-described known clamping device in which the clamping members are, in the open position, perpendicular to the rope axis, the desired transverse force which effects the clamping decreases as a function of the angle of inclination of the clamping members, the initial inclination of the clamping members, which is in the opposite direction according to the invention, has precisely the reverse effect. The further the clamping members are erected, the narrower the rope passage formed by the rope openings becomes in places and the more clamping force per unit of rope traction is obtained, since the lever are which determines the torque of the clamping members becomes longer. This reinforcing effect guarantees a holding force which is equal to the breaking load, and, indeed, even when a relatively small number, for example, four clamping members are used.

On the other hand, however, the controlled easing of the rope (paying out) is facilitated, in comparison with the known rope clamp, by the reciprocal functional relationship between the traction and the clamping force. The clamping force can be regulated in a controlled manner by hand, with relatively little force, by inclining the clamping members rearwards, this being not only a great advantage for sailing applications, but opening up a whole series of completely new possible applications for a rope clamp of this type.

It is proposed, furthermore, that plane clamping plates of approximately the same thickness as the rope are provided as clamping members, the centre axes of the preferably cylindrical rope openings run obliquely to the clamping plates and, in the inclined open position of the clamping plates, the rope openings are aligned with one another along the same axis. The clamping plates will preferably be arranged so that they have only a small mutual spacing, in particular, the clamping plates can be in mutual contact with one another in the open position. As a result, the front edge of the rope opening of a clamping plate interacts, in the manner of nippers with the rear edge of the rope opening of the adjoining clamping plate, as a consequence of which a genuine clamping of the rope occurs locally, namely at as many points as there are contact faces between the clamping plates, for example, in the case of four clamping plates, three such clamping points. To protect the rope, the edges of the rope openings are suitably rounded.

Thick clamping plates are also very easy to mount. They can simply receive a bore which runs parallel to one plate edge and parallel to the plate plane, the edge being rounded cylindrically.

It has been shown that it is better if the clamping plates are not hinged to one another via a common setting rod. It is therefore proposed to move the clamping plates which can individually be pivoted mutually, due to the fact that the clamping plate which is at the front in respect of the rope pulling direction can be pivoted by means of a hand lever and a spring presses on the rear clamping plate in the rope pulling direction. This spring causes the clamping operation to start when the hand lever is released. On the other hand, by pressing the hand lever, the set of clamping plates can comfortably be moved back in the direction of the open position, the clamping force diminishing gradually and uniformly so that the rope movement which is started is kept under control.

It is appropriate to take care to ensure that the hand lever can be secured in the open position of the clamping plates by means of a locking device, for example a catch arrangement. Furthermore, there are applications in which an unintentional opening of the rope clamp, when located in the clamping position, must be prevented under all circumstances. For this purpose, a special safety lever can be provided, which is introduced in the clamping position and which braces the hand lever, in the position in question, against swinging back.

For the normal case of guiding and clamping lines or ropes on sailing boats, it is proposed that there be provided an elongate housing, open at the top, which encloses the clamping plates and in whose bottom regin the clamping plates are mounted and which can be fastened to a support and has rope guide bores. Such a rope clamp is particularly elegantly shaped and easy to handle if the front clamping plate has an extension which serves as a hand lever and which overlaps the remaining clamping plates against the rope pulling direction. However, the housing can also be used for fitting, for example, into a mast. In this case, a hand lever will be provided on the side of the front clamping plate, which lies opposite in relation to the pivot axis.

Interesting applications, particularly to sailing boats, arise if each clamping member has two parallel rope openings next to one another. Two parallel ropes can then be guided through a double rope clamp of this type. Its essential feature is that the clamping forces which act on the two ropes are of exactly equal size. Thus, for example, a rope which constitutes a loaded loop can be moved without varying the loop diameter. This is done by hauling in one end of the rope against the load. In so doing, the clamping plates approach the open position. Consequently, the clamping effect on the second rope is also reduced and the latter runs out in the direction of the load under the same tension.

Figure 2:
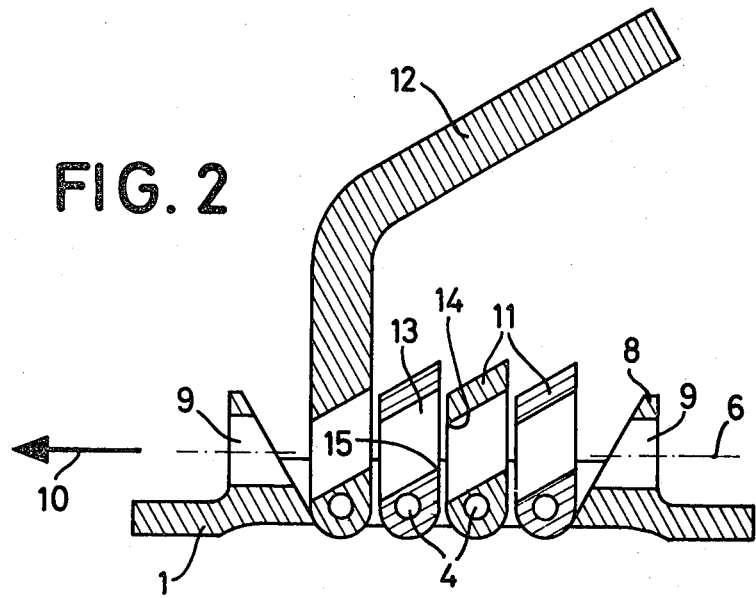
Figure 3:
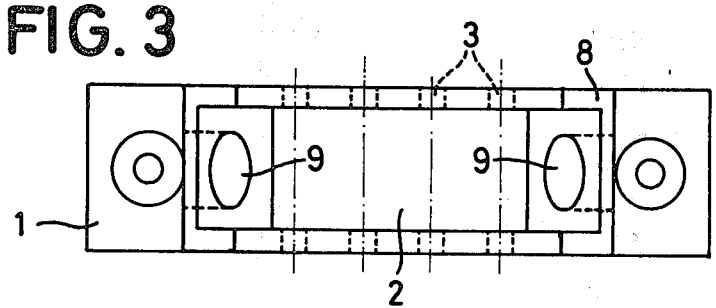
Figure 4:
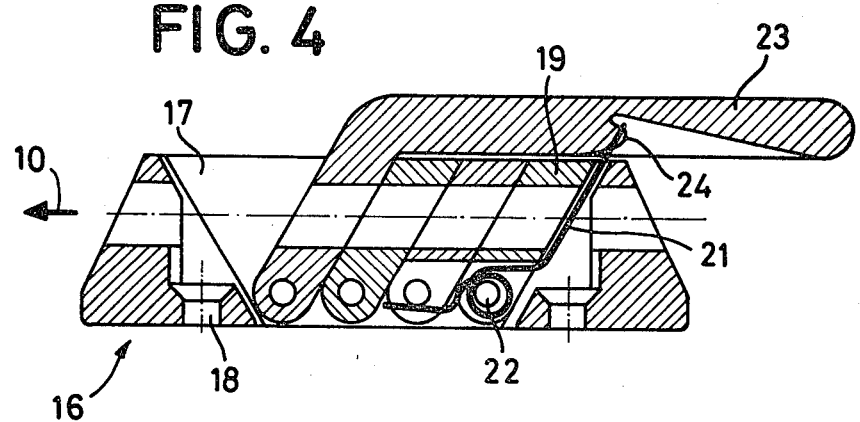
Figure 5:
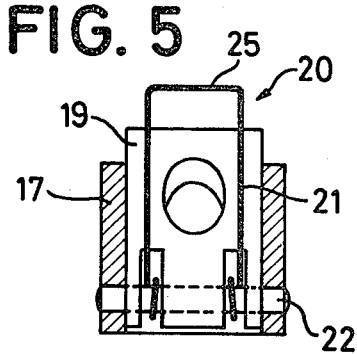

Two exemplary embodiments of the invention are described below with reference to the drawing in which:

FIG. 1 is a longitudinal section of a first rope clamp in the open position,

FIG. 2 shows this rope clamp in a clamping position, the clamping plates being perpendicular to the rope axis, FIG. 3 is a plan view of the base plate of the rope clamp according to FIGS. 1 and 2, FIG. 4 is a longitudinal section of a further rope clamp in the open position and FIG. 5 is a view of a clamping plate of the rope clamp according to FIG. 4, from a direction perpendicular to the plate plane, with a cross-section of the housing and with a spring.

The rope clamp according to FIGS. 1 to 3 has a base plate 1 which can be screwed onto a support. This base plate has a recess 2 in whose sides parallel bearing bores 3 are provided to receive bearing pins 4. The bearing bores 3 are all located in a plane parallel to the contact face of the base plate 1, the so-called axial plane 5. Above this and perpendicular to the bearing bores 3, extends the rope axis 6 of a rope 7 which is indicated in a fragmentary manner. Rope guide bores 9 are made, in the direction of the rope is axis in two upwardly projecting stop-lugs 8 of the base plate 1.

The rope traction which brings about a clamping effect acts, in the case of this rope clamp, in the direction of the arrow 10. Four clamping plates 11 are mounted pivotably in the base plate 1 by means of the bearing pins 4. The clamping plate which is at the front in the rope pulling direction is extended into a lever 12. In the open position according to FIG. 1, the clamping plates 11 are inclined against the rope pulling direction through an angle $\alpha$ of approximately 30°. The spacing of the bearing bores 3 is selected so that the clamping plates 11 just touch one another at this angle of inclination, in which case the clamping plate which is at the rear in respect of the rope pulling direction lies against the stop-lug 8 in question.

Each clamping plate 11 has a cylindrical rope bore 13, and these rope bores are guided obliquely to the clamping plates, in such a way that, in the above-mentioned inclined position of the clamping plates (open position), they constitute, as a whole and together with the rope guide bores 9, a cylindrical rope passage. In the open position, the rope clamp fulfils the function of an eyelet, that is to say, the rope runs freely through the above-mentioned rope passage.

When the lever 12 is pivoted in the rope pulling direction, the remaining clamping plates 11 follow this movement as a result of the rope friction. Lenticular narrowings of the rope passage occur, which clamp the rope. The rope clamping becomes stronger with the decrease in the angle of inclination and adjusts itself automatically according to the effective rope traction, the compressibility and the thickness of the rope. The edges and, in particular, the edge zones 14 and 15, which are at the front and at the rear respectively of the rope bores 13, and which act in the manner of nippers, are rounded more or less, depending on the rope material, so that damage to the rope is avoided.

The rope passage narrows further if the clamping plates 11 are pivoted further in the rope pulling direction beyond the position shown in FIG. 2. However, this case does not normally occur if the rope essentially fills the rope bores 13, which is to be desired.

By pressing down the lever 12, the clamping effect can be reduced in a controlled manner, so that the rope can be slackened and paid out in any desired amounts.

In the second exemplary embodiment according to FIG. 4, the base plate is developed into a housing 16 which has a wall 17 which is of equal height all round and fastening bores 18 lying on the inside. A spring 20 bent from wire is located behind the clamping plate 19 which is at the rear in the rope pulling direction. The two legs 21 of this spring are coiled round the bearing pin 22 of the clamping plate 19 and are braced with their ends on the adjacent bearing pin. This spring 20 strives to swing the clamping plate 19 and, consequently, also the remaining clamping plates in the rope pulling direction. On the other hand, it serves to secure the lever 23 in the open position. A catch 24 provided on the underside of the lever 23 engages—as shown in FIG. 4—under the horizontal section 25 of the spring 20 and can easily be released again by abruptly pulling the lever upwards.

I claim:

1. A clamp for securing and releasing a rope in a controlled fashion, the rope having an axis, the clamp comprising:

a base; and a plurality of clampilng members each having an opening therein through which the rope may pass, each said opening having an axis as well as a forward and a rear edge zone, each clamping member being attached proximate one end thereof to said base for pivotable movement independent of the pivotable movement of the other clampling members in response to a force applied to one of said clamping members, the pivot axis of each clamping member being spaced from and parallel to the pivot axis of the other clamping members and lying in a common plane and also being transverse to and spaced from the axis of the rope, said clamping members having an open position in which each said clamping member lies in a plane at an oblique angle to the common axial plane containing the pivot axes of said clamping members for permitting the free passage of the rope through said openings;

wherein said openings are generally co-axial with one another and with the rope when said clamping members are in said open position; and wherein said clamping members are relatively thick in relationship to their length, the thickness of said clamping members being measured generally along said axis of said opening therein, and the length thereof being measured generally along said oblique angle so that the rope is held in said clamp by coaction of the rear edge zone and forward edge zone of adjacent clamping members.

2. The clamp of clamp 1, further comprising:

a lever attached to one of said clamping members for applying controlled tension to said rope and for opening and closing said clamp.

3. The clamp of claim 1, wherein the thickness of each clamping member is approximately equal to the diameter of the rope.

4. The clamp of claim 1 further comprising:

an elongate housing open at the top, said housing comprising the base and at least one support containing a rope guide, said rope guide having an axis which is co-axial with the axis of the opening when the clamping members are in the open position.

* * * * *